(12) United States Patent
Carlough et al.

(10) Patent No.: US 7,519,645 B2
(45) Date of Patent: Apr. 14, 2009

(54) SYSTEM AND METHOD FOR PERFORMING DECIMAL FLOATING POINT ADDITION

(75) Inventors: Steven R. Carlough, Poughkeepsie, NY (US); Wen H. Li, Poughkeepsie, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 11/055,231

(22) Filed: Feb. 10, 2005

(65) Prior Publication Data

US 2006/0179099 A1   Aug. 10, 2006

(51) Int. Cl.
*G06F 7/485*   (2006.01)
(52) U.S. Cl. ...................................... 708/505
(58) Field of Classification Search ................. 708/505
See application file for complete search history.

(56) References Cited

U.S. PATENT DOCUMENTS

| | | | |
|---|---|---|---|
| 3,629,565 A | 12/1971 | Schmookler et al. | |
| 4,138,731 A | 2/1979 | Kamimoto et al. | |
| 4,172,288 A | 10/1979 | Anderson | |
| 4,718,033 A | 1/1988 | Miller | |
| 4,805,131 A | 2/1989 | Adiletta et al. | |
| 5,687,359 A * | 11/1997 | Smith, Sr. | 712/222 |
| 5,808,926 A | 9/1998 | Gorshtein et al. | |
| 5,928,319 A | 7/1999 | Haller et al. | |
| 6,018,756 A * | 1/2000 | Wolrich et al. | 708/505 |
| 6,292,819 B1 | 9/2001 | Bultmann et al. | |
| 6,578,060 B2 * | 6/2003 | Chen et al. | 708/505 |

\* cited by examiner

*Primary Examiner*—David H Malzahn
(74) *Attorney, Agent, or Firm*—Cantor Colburn LLP; Lynn Augsperger

(57) ABSTRACT

A method for performing a decimal floating point operation. A first operand including a first coefficient and a first exponent is received. The method also includes receiving a second operand that includes a second coefficient and a second exponent. An operation associated with the first operand and the second operand is received. The operation is an addition or a subtraction. Three concurrent calculations are performed on the first operand and the second operand. The first concurrent calculation includes applying the operation to the first operand and the second operand based on a first assumption that the first exponent is equal to the second exponent. The applying the operation based on the first assumption results in a first result and includes utilizing a two cycle adder. The second concurrent calculation includes applying the operation to the first operand and the second operand based on a second assumption that an absolute difference between the first exponent and the second exponent is less than or equal to a number of leading zeros in the coefficient of the operand with the larger exponent. The applying the operation based on the second assumption results in a second result and includes utilizing the two cycle adder. The third concurrent calculation includes applying the operation to the first operand and the second operand based on a third assumption that the absolute difference between the first exponent and the second exponent is greater than the number of leading zeros in the coefficient of the operand with the larger exponent. The applying the operation based on the third assumption results in a third result and includes utilizing the two cycle adder. A final result is selected from the first result, the second result and the third result.

10 Claims, 2 Drawing Sheets

X = operand 1 = $X_{coef} * 10 \wedge X_{exp}$
Y = operand 2 = $Y_{coef} * 10 \wedge Y_{exp}$
D = exponent difference = $X_{exp} - Y_{exp}$
$Z_{BIG}$ = number of leading zero's in the operand with the larger exponent.
M = max(|X|,|Y|)
N = min(|X|,|Y|)

| Cycle | CASE 1<br>D = 0 | CASE 2<br>D ≤ Z | CASE 3<br>D > Z |
|---|---|---|---|
| 0 | $A_{LO}$ β X<br>$B_{LO}$ β Y | $A_{LO}$ β X<br>$B_{LO}$ β Y | $A_{LO}$ β X<br>$B_{LO}$ β Y |
| 1 | $A_{LO}$ β decode($X_{coef}$)<br>$B_{LO}$ β decode($Y_{coef}$)<br>$A_{HI}$ β decode($Y_{coef}$)<br>$B_{HI}$ β decode($X_{coef}$)<br>D β |$A_{exp} - B_{exp}$| | $A_{LO}$ β decode($X_{coef}$)<br>$B_{LO}$ β decode($Y_{coef}$)<br>$A_{HI}$ β decode($Y_{coef}$)<br>$B_{HI}$ β decode($X_{coef}$)<br>D β |$A_{exp} - B_{exp}$| | $A_{LO}$ β decode($X_{coef}$)<br>$B_{LO}$ β decode($Y_{coef}$)<br>$A_{HI}$ β decode($Y_{coef}$)<br>$B_{HI}$ β decode($X_{coef}$)<br>D β |$A_{exp} - B_{exp}$| |
| 2 | ADDL1 β $X_{coef} - Y_{coef}$<br>ADDH1 β $Y_{coef} - X_{coef}$ | Z β LZD(Big)<br>ROT β Big <<$_1$ D<br>$B_{LO}$ β Small<br>$A_{HI}$ β Small | Z β LZD(Big)<br>$S_N$ = D - Z |
| 3 | ADDL2 β $X_{coef} - Y_{coef}$<br>ADDH2 β $Y_{coef} - X_{coef}$ | $B_{HI}$ β Big <<$_2$ D<br>$A_{LO}$ β Big <<$_2$ D | ROT β Big <<$_1$ Z |
| 4 | Sum = Result Select<br>Encode Sum | ADDL1 β Big - Small<br>ADDH1 β Small - Big | $A_{LO}$ β Big <<$_2$ Z<br>$B_{HI}$ β Big <<$_2$ Z<br>ROT β Small >>$_1$ D-Z |
| 5 | | ADDL2 β Big - Small<br>ADDH2 β Small - Big | $A_{HI}$ β Small >>$_2$ D-Z<br>$B_{LO}$ β Small >>$_2$ D-Z |
| 6 | | Sum = Result Select<br>Encode Sum | ADDL1 β Big - Small<br>ADDH1 β Small - Big |
| 7 | | | ADDL2 β Big - Small<br>ADDH2 β Small - Big |
| 8 | | | Sum = Result Select<br>Encode Sum |

FIGURE 1

SYSTEM AND METHOD FOR PERFORMING DECIMAL FLOATING POINT ADDITION

TRADEMARKS

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND OF THE INVENTION

This invention relates generally to decimal floating point addition, and more particularly, to decimal floating point addition using multiple concurrent paths.

Decimal floating point has been used in calculators for many years but for the first time is becoming part of an IEEE standard (754R Floating Point Standard). Addition is the primary arithmetic instruction and it is critical to the performance of a decimal floating point unit. Floating point arithmetic is more complex than fixed point arithmetic due to the requirement to align the operations. Typically, the time required for a decimal floating point addition or subtraction operation is limited to the time required for the case where both operands must be shifted prior to the adder operation. Decimal floating point formats, as defined by the IEEE 754R standard, include a double word format containing sixteen digits for the coefficient and a quad word format containing thirty-four digits for the coefficient. Note that the coefficients are integer and are not normalized and therefore, can contain leading zeros. With the advent of the new standard and the increase in the use of decimal arithmetic operations for financial calculations, it becomes desirable to implement these operations at a high performance.

BRIEF SUMMARY OF THE INVENTION

Exemplary embodiments of the present invention include a method for performing a decimal floating point operation. The method includes receiving a first operand including a first coefficient and a first exponent. The method also includes receiving a second operand including a second coefficient and a second exponent. An operation associated with the first operand and the second operand is received. The operation is an addition or a subtraction. Three concurrent calculations are performed on the first operand and the second operand. The first concurrent calculation includes applying the operation to the first operand and the second operand based on a first assumption that the first exponent is equal to the second exponent. The applying the operation based on the first assumption results in a first result and includes utilizing a two cycle adder. The second concurrent calculation includes applying the operation to the first operand and the second operand based on a second assumption that an absolute difference between the first exponent and the second exponent is less than or equal to a number of leading zeros in the coefficient of the operand with the larger exponent. The applying the operation based on the second assumption results in a second result and includes utilizing the two cycle adder. The third concurrent calculation includes applying the operation to the first operand and the second operand based on a third assumption that the absolute difference between the first exponent and the second exponent is greater than the number of leading zeros in the coefficient of the operand with the larger exponent. The applying the operation based on the third assumption results in a third result and includes utilizing the two cycle adder. A final result is selected from the first result, the second result and the third result.

An additional embodiment includes a system for performing a decimal floating point operation. The system includes a two cycle adder, a final result selector, and a mechanism for receiving a first operand including a first coefficient and a first exponent. The mechanism also receives a second operand including a second coefficient and a second exponent. An operation associated with the first operand and the second operand is received, where the operation is an addition or a subtraction. Three concurrent calculations are performed on the first operand and the second operand. The first concurrent calculation includes applying the operation to the first operand and the second operand based on a first assumption that the first exponent is equal to the second exponent. The applying the operation based on the first assumption results in a first result and includes utilizing the two cycle adder. The second concurrent calculation includes applying the operation to the first operand and the second operand based on a second assumption that an absolute difference between the first exponent and the second exponent is less than or equal to a number of leading zeros in the coefficient of the operand with the larger exponent. The applying the operation based on the second assumption results in a second result and includes utilizing the two cycle adder. The third concurrent calculation includes applying the operation to the first operand and the second operand based on a third assumption that the absolute difference between the first exponent and the second exponent is greater than the number of leading zeros in the coefficient of the operand with the larger exponent. The applying the operation based on the third assumption results in a third result and includes utilizing the two cycle adder. A final result is selected by the final result selector from the first result, the second result and the third result.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an exemplary embodiment of a timing diagram for an addition process that may be utilized by exemplary embodiments of the present invention.

Figure 2:
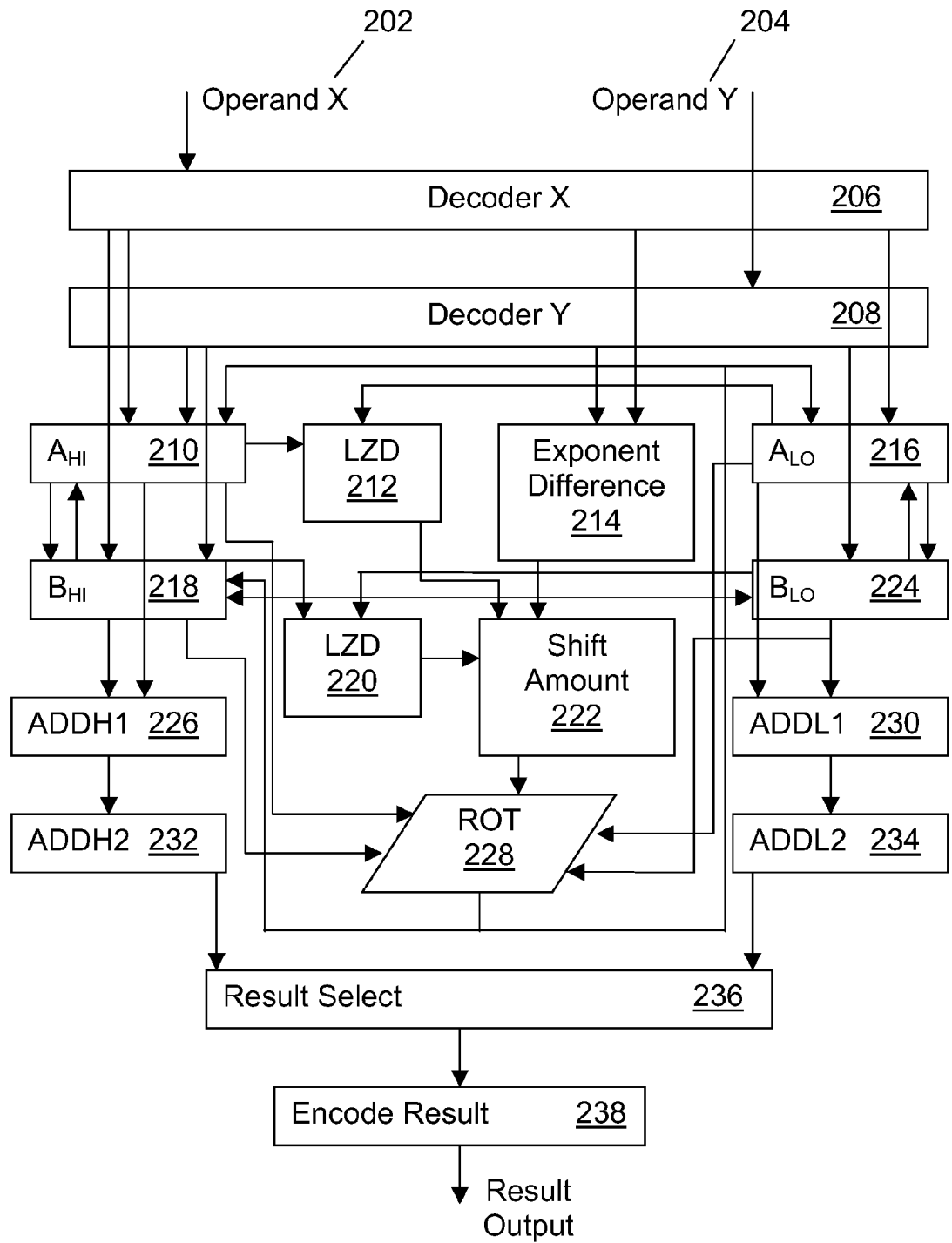
FIG. 2 illustrates an exemplary embodiment of a hardware diagram for decimal floating point addition and subtraction that may be utilized by exemplary embodiments of the present invention.

The detailed description explains the preferred embodiments of the invention, together with advantages and features, by way of example with reference to the drawings.

DETAILED DESCRIPTION OF THE PREFERRED EMBODIMENTS

Decimal floating point addition may require one of three types of alignment: case one where the exponents equal; case two where only left shifting of the operand with the bigger exponent is required; and case three where both left shifting of the operand with the bigger exponent and right shifting of the operand with the smaller exponent is required. The operand with the bigger exponent is referred to as BIG, and the operand with smaller exponent is referred to as SMALL. Note that BIG may be smaller than SMALL (e.g. 500.*$10^{-2}$ is less than 6000.*$10^{-3}$.) In exemplary embodiments of the present invention, all three cases are started concurrently with preference given to the most frequent cases, which is case one followed by case two followed by case three. The concurrent execution of these three cases optimizes the implementation for all three cases.

Decimal floating point addition and subtraction require several steps to complete the operation. Two of these steps may involve aligning one or both of the operand coefficients prior to sending them through a decimal adder. This is different than binary floating point which only involves aligning the smaller operand because the coefficients are normalized except for de-normalized operands. If only one operand were aligned, then the adder width would be required to be 2*P+2 digits, where P is the number of digits of precision. The adder width is critical in the design and in most implementations is limited to P+2 digits wide. This is the minimum width possible to preserve enough bits of precision to accurately round an intermediate result if both operands are aligned.

FIG. 1 illustrates an exemplary embodiment of a timing diagram for an addition process that may be utilized by exemplary embodiments of the present invention. The timing diagram in FIG. 1 includes: an operand $X=X_{coef}*10\char`^X_{exp}$; an operand $Y=Y_{coef}*10\char`^Y_{exp}$; an exponent difference $D=|X_{exp}-Y_{exp}|$; and $Z_{(big)}$=the number of leading zeros in the operand with the larger exponent. In FIG. 1, a decimal algorithm is separated into the three cases of alignment discussed above. Case one, where D=0 (i.e., $X_{exp}-Y_{exp}=0$) is described in the first column labeled "case 1" in FIG. 1. When the operands contain identical exponent fields, then no alignment is necessary and the coefficients may be sent directly to a decimal adder after they have been decoded. As shown in FIG. 1, at cycle 0, X is stored in the low part of the A register and Y is stored in the low part of the B register. During cycle 1, the X and Y coefficients are decoded and/or un-compacted into a binary coded decimal (BCD) format. In addition the value of D is calculated. At cycles 2 and 3, the two cycle adders subtract the X and Y coefficients from each other. During cycle 4, one of the two results is selected, based, for example, on which subtraction resulted in a positive result. In addition, during cycle 4, the selected result is encoded and stored as the encoded sum.

Case two, where $D \leq Z_{(big)}$ occurs when the exponent difference between the operands is less than or equal to the number of leading zeros in the operand with the larger exponent. In this case, only the larger operand needs to be shifted. If $Z_{(big)}$ is the number of leading zeros in the operand with the larger exponent, D is the exponent difference, and $D \leq Z_{(big)}$, then $S_{coef}=(X_{coef}*10^D) \pm Y_{coef}$. $S_{coef}$ is the coefficient of the result, $X_{coef}$ is the coefficient of BIG, $Y_{coef}$ is the coefficient of SMALL and the operation $(X_{coef}*10^D)$ can be realized by a left shift of $X_{coef}$ by $Z_{(big)}$ digits. This is referred to in FIG. 1, as "case 2."

As shown in FIG. 1, under the column labeled "case 2", at cycle 0, X is stored in the low part of the A register and Y is stored in the low part of the B register. During cycle 1, the X and Y coefficients are decoded and/or un-compacted into a binary coded decimal (BCD) format. In addition the value of D is calculated. At cycle 2, a leading zero detect is performed on the operand with the bigger exponent, referred to as BIG, (in this example, X) and the coefficient of BIG is rotated left by D digits. In addition, at cycle 2, the coefficient of the operand with the smaller exponent, referred to as SMALL, is stored in the low portion of the B register and the high portion of the A register. During cycle 3, the coefficient of BIG is shifted left by D digits is stored in the high portion of the B register and the low portion of the A register. At cycles 4 and 5, the two cycle adders subtract the X and Y coefficients from each other. During cycle 6, one of the two results is selected, based, for example, on which subtraction resulted in a positive result. In addition, during cycle 6, the selected result is encoded and stored as the encoded sum.

Case three, where $D>Z_{(big)}$, occurs when the exponent difference between the operands is greater than the number of leading zeros in the operand with the larger exponent. In this case, both of the operands must be shifted. The operand with the larger exponent, referred to as BIG, must be shifted left by $Z_{(big)}$ and the operand with the smaller exponent, referred to as SMALL, must be shifted right by $D-Z_{(big)}$. For example, if $D>Z_{(big)}$ then $S_{coef}=(X_{coef}*10^Z) \pm (Y_{coef}*10^{(D-A)})$. The operation $(X_{coef}*10^Z)$ can be realized by a left shift of $Z_{(big)}$ digits and the operation $(Y_{coef}*10^{(D-Z)})$ may be realized by a right shift of $D-Z_{(big)}$ digits. This is referred to in FIG. 1, as "case 3."

As shown in FIG. 1, under the column labeled "case 3", at cycle 0, X is stored in the low part of the A register and Y is stored in the low part of the B register. During cycle 1, the X and Y coefficients are decoded and/or un-compacted into a binary coded decimal (BCD) format. In addition the value of D is calculated. At cycle 2, a leading zero detect is performed on the operand with the bigger exponent (in this example, X). In addition, at cycle 2, the shift right amount for the operand with the smaller exponent is calculated as D–Z. During cycle 3, BIG is rotated left by Z digits. During cycle 4, the coefficient BIG is shifted left by Z digits is stored in the high portion of the B register and the low portion of the A register. In addition, the coefficient of SMALL is rotated right by D–Z digits. During cycle 5, the contents of the high portion of the A register and the contents of the low portion of the B register (i.e., the coefficient of the operand with the smaller exponent) are shifted left by D–Z digits. At cycles 6 and 7, the two cycle adders subtract the X and Y coefficients from each other. During cycle 8, one of the two results is selected, based, for example, on which subtraction resulted in a positive result. In addition, during cycle 8, the selected result is encoded and stored as the encoded sum.

FIG. 2 illustrates an exemplary embodiment of a hardware diagram for decimal floating point addition and subtraction that may be utilized by exemplary embodiments of the present invention. The hardware includes of two operand decoders (decoder X 206 and decoder Y 208) that decode the two operands (operand X 202 and operand Y 204) from the format described in the IEEE 754R floating point standard to a decimal coefficient and a binary exponent. Registers $A_{LO}$ 216 and $B_{LO}$ 224 are connected to decoder X 206 and decoder Y 208, respectively. Registers $A_{HI}$ 210 and $B_{HI}$ 218 are each connected to both decoders (decoder X 206 and decoder Y 208). When double precision operands (16 digit coefficients) are processed, a copy of operand X 202 from decoder X 206, placed in $A_{LO}$ 216, is placed in $B_{HI}$ 218, and a copy of operand Y 204 from decoder Y 208, placed in $B_{LO}$ 224, is placed in $A_{HI}$ 210. This allows the two halves of the adder hardware, ADDH1 226, ADDL1 230, ADDH2 232, and ADDL2 234 to simultaneously compute X–Y and Y–X in the unit if the operation is an effective subtraction.

As depicted in FIG. 2, the decimal adder is pipelined across two cycles, with the first half of the addition/subtraction operation taking place in ADDH1 226 and ADDL1 230, and the second half of the addition/subtraction operation taking place in the following cycle in ADDH2 232 and ADDL2 234. The adder may also be split to operate as two separate pipelined 18 digit adders (ADDH1 226 ADDH2 232 and ADDL1 230 ADDL2 234) or may operate as a single wide 36 digit adder. For quad precision operands with 34 digit coefficients, the $A_{HI}$ 210 gets the most significant 18 digits of the operand X 202 coefficient from decoder X 206 and the $B_{HI}$ 218 gets the most significant 18 digits of operand Y 204 coefficient from decoder Y 208. The adder is then configured to operate as a 34-digit decimal adder and the hardware computes X−Y in the first cycle followed by Y−X in the second cycle and selects the correct result if the operation is an effective subtraction (for addition the two results are the same).

The exponent portion of the operands is sent to the exponent difference hardware 214 that determines the difference between the two exponents (D). Leading zero detect hardware (LZD) 212 is connected to the $A_{HI}$ 210 $A_{LO}$ 216 register pair and LZD 220 is connected to the $B_{HI}$ 218 $B_{LO}$ 224 register pair to determine the significance of the operands (operand X 202 and operand Y 204). The shift amount logic 222 determines which shift values are sent to the rotator 228 and computes the difference between the exponent difference and the number of leading zeros of the operand with the larger exponent value (D−Z). The result select logic 236 can chose between the result from the ADDH2 232 and the ADDL2 234 when double precision operands are processed in parallel. Alternatively, the result select logic 236 may select between keeping the current quad precision result and initiating a new quad precision result for quad precision effective subtraction operations.

The encode result logic 238 converts the result coefficient and exponent into the target format described in the IEEE754R standard for floating point numbers and outputs the result.

The double word algorithm begins when the operands are read and decoded into a decimal coefficient and a binary exponent. An assumption is made that the exponents are equal and the coefficients are sent directly to the decimal adder without any shifting. In the next cycle the first add cycle takes place in the ADDH1 226 and ADDL1 230 blocks. At the same time that the first addition cycle is occurring, the exponent difference is calculated (D) and the significance of the operands is determined by detecting the number of leading zeros they contain. The number of leading zeros of the operand with the larger of the two exponents is referred to as $Z_{(big)}$ or Z. In the next cycle, the un-shifted operands are sent to the second adder cycle. If the exponent difference computed in the last cycle was not zero, then processing will halt on this data in the next cycle. It is common in high speed design for the result of an operation to be fed back through the control logic before it may effect the process flow. This is why, in an exemplary embodiment of the present invention, processing on this path continues for one extra cycle past the determination of D when D was not zero.

In parallel with the second adder cycle for the unshifted operands, the operand with the larger exponent is left shifted by the exponent difference D. Also, on this cycle, the difference between the exponent difference and the number of leading zeros of the larger of the two operands (Z) are compared to determine if there were enough available leading zeros to shift the operand left by D without shifting out valid operand digits. On the next cycle, processing stops for the un-shifted operands if D was not 0. If D is zero, then the correct result is selected from ADDH2 232 or ADDL2 234. On the same cycle, the operands for Case 2 (operand with the larger exponent shifted left by D) enter the first adder cycle in ADDL1 230 and ADDH1 226. Also on this cycle, the operand with the larger operand is shifted left by Z.

On the next cycle, if D=0, then the result coefficient and exponent from case 1 are encoded and output from the unit. D ' 0 and D=Z then the Case 2 operands enter the second adder cycle in ADDH2 232 and ADDL2 234, otherwise processing halts on these operands. If D<Z, then the operand with the smaller of the two operands is shifted right by D−Z digits. On the next cycle, for Case 2, operands enter the result select logic 236, where processing will continue on subsequent cycles similar to the completion of Case 1 previously described. For Case 3, the operands enter the first adder cycle in ADDH1 226 and ADDL1 230 where results will be processed through the second adder cycle, the result select logic 236, and the encode result logic 238 with the result output similar to the other two cases with one exception. Case 3 results may require rounding to occur in the result select logic 236 before the result coefficient can be sent to the encode result logic 238 and be output from the unit.

Quad precision operands are processed in much the same way that the double precision operands are processed. Processing occurs for all three cases in parallel to minimize the average delay through the unit. The only difference is that the full width of the adder is required, so for effective subtraction operations, the operation Xcoef−Ycoef is started through the adder for all three cases, and Ycoef−Xcoef is started through the adder on the following cycle. This is done by swapping the contents of the $A_{HI}$ 210 $A_{LO}$ 216 register pair with the $B_{HI}$ 218 $B_{LO}$ 224 register pair.

The novelty of exemplary embodiments of the present invention lies at least in executing these three cases concurrently and later selecting the appropriate result after the case is determined. It can be determined early that case 1 should be chosen since an exponent compare equal is very fast. In contrast, it requires several cycles to detect the leading zeros and determine the operand with the larger exponent and eventually compare it to the exponent difference to tell whether the data dictates case 2 or case 3. Also, for an effective subtraction operation (e.g. addition of opposite signed numbers) X−Y is computed at the same time as Y−X since it is not known beforehand whether X is greater than Y and a positive magnitude is desired for the sum. So, all three cases are executed concurrently as well as the concurrent execution of both possible subtractions.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention, can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for performing a decimal floating point operation, the system comprising:
   a first register storing a first coefficient and a first exponent;
   a second register storing a second coefficient and a second exponent;
   a mechanism including exponent difference circuitry calculating an absolute difference between the first exponent and the second exponent, leading zero detect circuitry connected to the first register and the second register, rotator circuitry connected to the first register, the second register, the exponent difference circuitry and the leading zero detect circuitry, a two cycle adder connected to the first register and the second register, result selector circuitry connected to the two cycle adder, the mechanism:
   receiving an operation associated with the first operand and the second operand, wherein the operation is an addition or a subtraction;
   performing three concurrent calculations on the first operand and the second operand, the three concurrent calculations including:
   applying the operation to the first operand and the second operand based on a first assumption that the first exponent is equal to the second exponent, wherein the applying the operation based on the first assumption results in a first result and includes utilizing the two cycle adder;
   applying the operation to the first operand and the second operand based on a second assumption that an absolute difference between the first exponent and the second exponent is less than or equal to a number of leading zeros in the coefficient of the operand with the larger exponent, wherein the applying the operation based on the second assumption results in a second result and includes utilizing the exponent difference circuitry, the rotator circuitry, and the two cycle adder; and
   applying the operation to the first operand and the second operand based on a third assumption that the absolute difference between the first exponent and the second exponent is greater than the number of leading zeros in the coefficient of the operand with the larger exponent, wherein the applying the operation based on the third assumption results in a third result and includes utilizing the exponent difference circuitry, the leading zero detect circuitry, the rotator circuitry, and the two cycle adder; and
   selecting a final result using the result selector circuitry, the selecting from the first result, the second result and the third result.

2. The system of claim 1 wherein the first result is selected as the final result if the first exponent is equal to the second exponent.

3. The system of claim 1 wherein the second result is selected as the final result if the absolute difference between the first exponent and the second exponent is less than or equal to the number of leading zeros in the larger of the first operand and the second operand.

4. The system of claim 1 wherein the third result is selected as the final result if the absolute difference between the first exponent and the second exponent is greater than the number of leading zeros in the coefficient of the operand with the larger exponent.

5. The system of claim 1 wherein the mechanism further includes encoder result circuitry to encodes the final result.

6. The system of claim 1 wherein the two cycle adder is utilized by the applying the operation based on the first assumption during a first and second cycle, the two cycle adder is utilized by the applying the operation based on the second assumption during a third and fourth cycle, and the two cycle adder is utilized by the applying the operation based on the third assumption during a fifth and six cycle.

7. The system of claim 1 wherein the mechanism further comprises a second two cycle adder, wherein the operation is the subtraction and each of the three concurrent calculations include subtracting the first operand from the second operand on the two cycle adder and subtracting the second operand from the first operand on the second two cycle adder.

8. The system of claim 1 wherein the applying the operation based on the first assumption includes adding the first coefficient to the second coefficient if the operation is the addition, or one or both of subtracting the first coefficient from the second coefficient and subtracting the second coefficient from the first coefficient if the operation is the subtraction.

9. The system of claim 1 wherein the applying the operation based on the second assumption includes:
   shifting the first coefficient to the left if the first coefficient is associated with the larger exponent;
   shifting the second coefficient to the left if the second coefficient is associated with the larger exponent; and
   adding the first coefficient to the second coefficient if the operation is the addition, or one or both of subtracting the first coefficient from the second coefficient and subtracting the second coefficient from the first coefficient if the operation is the subtraction.

10. The system of claim 1 wherein the applying the operation based on the third assumption includes:
    shifting the first coefficient to the left and the second coefficient to the right if the first coefficient is associated with the larger exponent;
    shifting the second coefficient to the left and the first coefficient to the right if the second coefficient is associated with the larger exponent; and
    adding the first coefficient to the second coefficient if the operation is the addition, or one or both of subtracting the first coefficient from the second coefficient and subtracting the second coefficient from the first coefficient if the operation is the subtraction.

* * * * *